United States Patent
Cato et al.

(10) Patent No.: US 6,728,751 B1
(45) Date of Patent: Apr. 27, 2004

(54) DISTRIBUTED BACK UP OF DATA ON A NETWORK

(75) Inventors: Robert Thomas Cato, Raleigh, NC (US); Eugene Michael Maximilien, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/527,004

(22) Filed: Mar. 16, 2000

(51) Int. Cl.⁷ .............................................. G06F 15/16
(52) U.S. Cl. ........................ 709/202; 709/217; 709/219; 709/223; 709/224; 709/226; 709/229
(58) Field of Search ................................ 709/202, 217, 709/223, 219, 224, 226, 229

(56) References Cited

U.S. PATENT DOCUMENTS

| | | | |
|---|---|---|---|
| 5,133,065 A | 7/1992 | Cheffetz et al. ............. 395/575 |
| 5,276,867 A * | 1/1994 | Kenley et al. ............... 707/204 |
| 5,386,545 A | 1/1995 | Gombos, Jr. et al. ....... 395/575 |
| 5,673,381 A | 9/1997 | Huai et al. .................... 395/180 |
| 5,745,669 A | 4/1998 | Hugard et al. ......... 395/182.01 |
| 5,764,903 A | 6/1998 | Yu ......................... 395/200.38 |
| 5,778,165 A | 7/1998 | Saxon .................... 395/182.02 |
| 5,829,023 A | 10/1998 | Bishop ........................ 711/118 |
| 5,832,511 A | 11/1998 | Beck et al. .................. 707/201 |
| 5,907,679 A | 5/1999 | Hoang et al. ............. 395/200.5 |
| 5,924,102 A | 7/1999 | Perks ........................... 707/200 |
| 6,212,531 B1 * | 4/2001 | Blea et al. ................... 707/204 |
| 6,304,980 B1 * | 10/2001 | Beardsley et al. .............. 714/6 |
| 6,311,213 B2 * | 10/2001 | Dawson et al. .............. 709/217 |
| 6,324,581 B1 * | 11/2001 | Xu et al. ...................... 709/229 |
| 6,324,627 B1 * | 11/2001 | Kricheff et al. ............. 711/163 |
| 6,363,462 B1 * | 3/2002 | Bergsten ...................... 711/162 |
| 6,366,988 B1 * | 4/2002 | Skiba et al. ................. 711/165 |
| 6,389,420 B1 * | 5/2002 | Vahalia et al. .................. 707/8 |
| 6,430,611 B1 * | 8/2002 | Kita et al. ................... 709/223 |
| 6,460,055 B1 * | 10/2002 | Midgley et al. ............. 707/204 |
| 6,539,461 B2 * | 3/2003 | Suzuki et al. ............... 711/162 |

FOREIGN PATENT DOCUMENTS

EP         899662 A1 *  3/1999

* cited by examiner

*Primary Examiner*—Jack B. Harvey
*Assistant Examiner*—Atai V. Nguyen
(74) *Attorney, Agent, or Firm*—J. Bruce Schelkopf

(57) ABSTRACT

Within a network of computers, a system administrator function controls the backing up of data of client machines to selected other client machines within the network by removing control of and access to portions of the hard files within those machines to the local user. The freed up storage space within the client's local hard files is then used for backup purposes to backup data from other machines within the network. Agents in the server and client machines perform this task making it possible to distribute the backup workload across the network. There are three modes of backup: source initiated, target initiated, and server communal backup (CB) agent initiated. All are coordinated by the server CB agent.

22 Claims, 4 Drawing Sheets

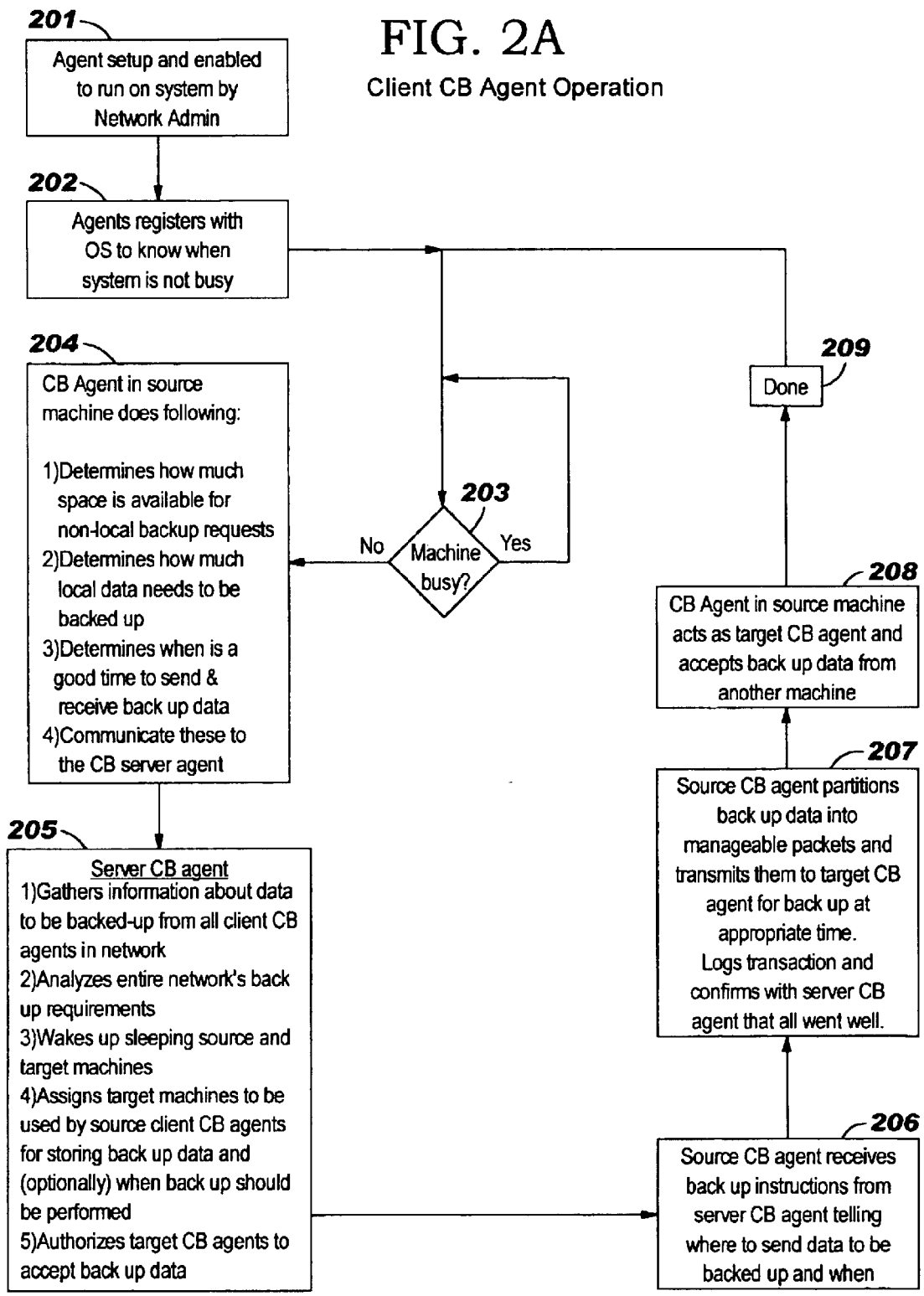

Client CB Agent Operation

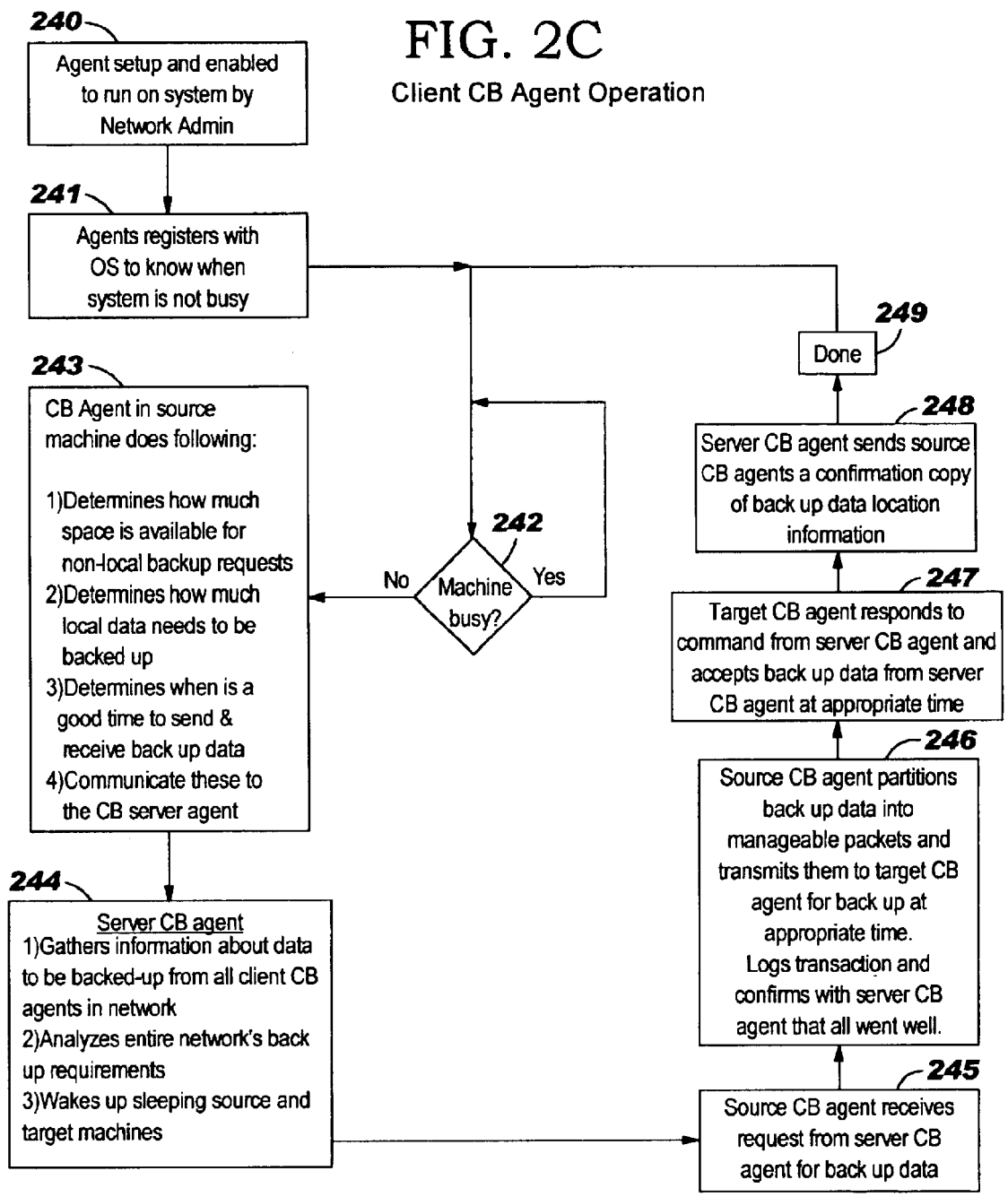

DISTRIBUTED BACK UP OF DATA ON A NETWORK

TECHNICAL FIELD

The present invention relates in general to data processing systems, and in particular, to the backing up of data within a network of data processing systems.

BACKGROUND INFORMATION

Backing up computer data and software is expensive. Hard file space typically costs less than 2¢ per megabyte, while certain organizations charge customers 15¢ per megabyte per month to handle backing up of computer data. Nevertheless, hard files are becoming so large and inexpensive that they are very frequently not filled to their capacity by their individual users. As an example, computers sold today typically include over an eight-gigabyte hard drive which is quite difficult to completely fill with data by the typical user. Therefore, within a network of computers, there is generally a large amount of free hard file space available for use. It would be an advantage in such a network environment to enable individual client machine local hard drives to be used to backup other machines' hard drive data in an efficient manner and in a way that does not excessively impact the performance of the individual computers. Therefore, there is a need in the art for a system for providing a communal backup of data within a network, even when the individual computer users may not voluntarily permit their machines to be used as backup or when machines are powered down by individual users.

SUMMARY OF THE INVENTION

The present invention addresses the foregoing need by extending the capabilities of a network system administrator ("SA") and the system administrator function of the network operating system ("OS"). The operating system would be modified to enable the SA to remove part of a local machine's hard drive from control of and access to by the local user. The SA would be able to do this despite the wishes of the local user. This storage space would be managed by a command backup ("CB") server agent that is located and executed in a server. The CB server agent can be OS independent thus suited for heterogeneous networks. The SA establishes, configures and manages the CB server agent. The SA can be located in a server. However, note that the present invention is also applicable to a system where the system administrator function resides in portions of local machines, which makes the present invention operable in heterogeneous networks lacking a dedicated server machine.

The CB server agent would coordinate the backing up of files in each of the local machines and control where the data was physically backed up. Though not a limitation, the CB server agent would not back up data on the physical machine from where the data originated. An OS independent (e.g., Java agent) client agent would be run in each local machine that would notify the CB server agent function when that local machine was available for backing up other machine's data. If the local machine was busy doing something else (CPU or hard file utilization was high) at a particular time, the local agent would signal the CB server agent not to use it for backup at that time.

Furthermore, the local machines could be equipped with LAN adapters having a "Wake Up On LAN" feature, which would allow a machine to be automatically powered on by the SA when it was needed to back up or retrieve data.

Three modes of back up are disclosed: source initiated, target initiated, and server communal back up (CB) agent initiated. All are coordinated by the server CB agent. The determination of which mode is superior depends on the characteristics of the machines used and the network to which they are connected.

The present invention is applicable to both heterogeneous and homogeneous networks.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A–2C illustrate a flow diagram of an embodiment of the present invention.

DETAILED DESCRIPTION

Figure 1:
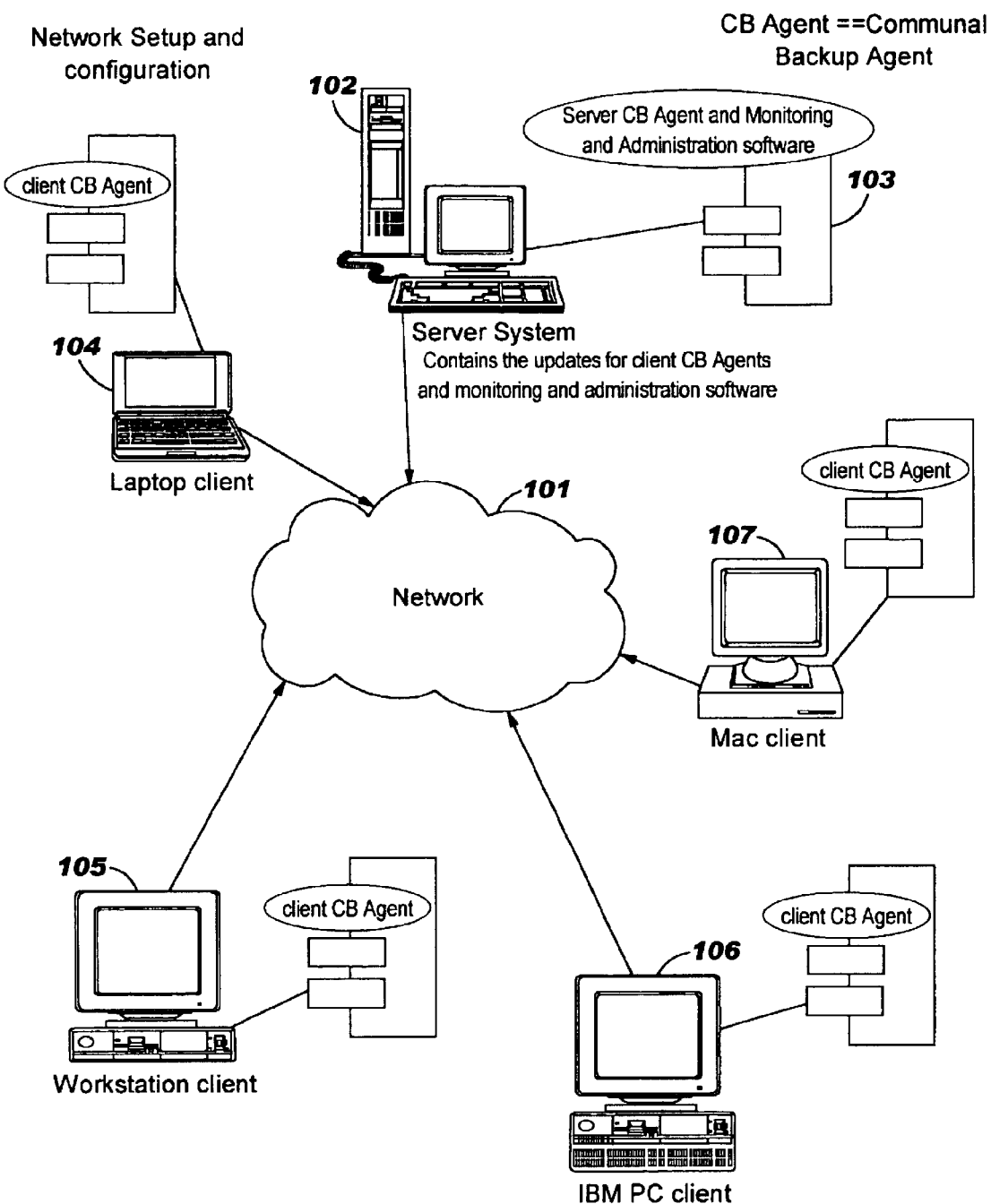
FIG. 1 illustrates a computer network configurable in accordance with the present invention.

In the following description, numerous specific details are set forth such as specific network configurations, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates an exemplary computer network embodying the present invention. Network 101 couples a plurality of local machines 104–107 to a server system 102. Local machine 104 may be a laptop client, local machine 105 may be a workstation client, local machine 106 may be a PC client, and local machine 107 may be a Macintosh client. However, the topology and makeup of the network in FIG. 1 are not limited to those machines illustrated or to any particular network topology. Network 101 may also be an open network, such as the Internet. Furthermore, though FIG. 1 illustrates local machines 104–107 coupled to a dedicated server 102, the present invention is also applicable to networks not having a dedicated server machine, wherein a system administrator function is distributed among the various machines within the network.

In the exemplary embodiment illustrated, server 102 contains a server communal backup (CB) agent program and system administrator function software 103. A communal backup agent is also stored on each of the client machines 104–107. Each client CB agent running on each local machine notifies the server CB agent 103 when that client machine is available for backing up other machines' data. A client communal backup agent will be loaded, or enabled if it is already part of the operating system, onto a client machine as needed by the system administrator software 103.

As noted above, various ones of the machines 102, 104–107 will have data that is to be backed up within the network 101. Additionally, various ones of the machines 102, 104–107 will have significant free hard file space available. The present invention makes use of such free hard file space by backing up data to these various hard files. As an example, for data residing within client machine 105 to then be backed up in the network 101, the present invention will attempt to back up the data into various ones of the other client machines 102, 104, 106, 107, which have sufficient free hard file space. The present invention makes use of such hard file space by removing control of and access to such space by the local user at that client machine. In most current modern operating systems (i.e., Win2K, UNIX and Linux, etc.), there is the concept of a disk "quota." The administrator or an administrator process can limit the disk usage of a user or process by limiting their quota. The CB agent could use this operating system API to limit the hard drive usage of a client by increasing or decreasing the quota. This could be done by the administrator at setup time. The resultant storage space is thereafter managed by the server CB agent 103 located in server 102. As a result, because the server CB 103 agent controls the individual client CB agents within the machines 104–107, and since the process of removing control of and access to portions of the hard file space in each machine is performed by the server CB agent 103, backup of data on individual machines is taken out of the control of the individual users of the machines, who essentially have no choice in the matter. As further described below, the user cannot even defeat the functionality of the present invention by shutting down their machine, since the present invention can alternatively make use of a Wake Up On LAN feature to turn on individual machines for use as backup. In this example, shutting the computer down results in it being put in a low power consumption sleep mode. Note that the power cord of the machine cannot be disconnected from its power source.

Referring to FIG. 2A, there is illustrated a flow diagram of an embodiment of the present invention, which will be referred to as the "source initiated back up mode." In step 201, individual client communal backup agents are set up and enabled to run on selected ones of the machines 104–107 by the network or system administrator software 103. Thereafter, in step 202, the client CB agents register with the operating system of their machine to know when the machine is idle. All modern operating systems have monitoring processes on the current foreground and background activities on the system. The monitored activities are both for users, processes (i.e., an application), devices and system activities. The operating system keeps statistics on these activities and provides an API to access these statistics (some of them could be "real-time" statistics or close to "real-time" or "soft real-time"). Using this API, and some criteria for "idleness," a programmer skilled in the art for that particular operating system could determine at any time if the operating system is idle or not. Part of the statistics that are kept are:

1. CPU usage per processes and total usage;
2. Memory usage per process and total;
3. Interrupt activity;
4. Disk I/O activity; and
5. Other I/O activity.

As an idle policy, one could decide that the system is idle if the CPU is at an average of fifteen percent (or some other empirical value) utilization for the past twenty minutes. Alternatively, one could decide that foreground processes (i.e., user applications) are at X percent activity for Y minutes indicating that the user has left the terminal and, therefore, this indicates that the machine is idle. The idleness of the machine is usually an indication that there are no processing-intensive activities occurring, meaning that the machine is not being used. Note, a background application could be running which ties up the CPU. This is usually the case for servers and server processes. The idle point can be made to be flexible and customizable to allow modifications for a particular environment. Note, empirical calculation and determination may also be used to determine when a machine is idle for a particular operating system and usage. Thereafter, in step 203, a determination is made whether the machine is idle. If not, then the process recycles upon itself Source initiated mode back up is similar to traditional data backup, in that the backup operation is initiated by the source or owner of the data. However, the CB agent in the source machine does not immediately start sending data to a back up (target) machine. First, in step 204, the source machine determines how much hard file space it has available for non-local (other machines) backup requests, how much local (its own) data needs to be backed up, and (optionally) when would be a good time to transmit and/or receive back up data. All operating systems that have secondary storage support have some type of API that allows processes to create files, delete them (with proper permission) and determine available hard drive space. The client CB agent of the present invention, by using its "idle policy" described above, and knowing how much space is available locally for a backup, can accept backup requests and/or send a backup request. This information is communicated to the server CB agent 103. In step 205, the server CB agent 103 considers this request, analyzes the entire network's back up data requirements, and assigns one or more target machine(s) for the source machine to use to back up its data. More than one target machine may be used to back up a single source machine's data. The analyzing task the server CB agent 103 performs involves ensuring that target machine(s) are functioning (they are powered up and running appropriate software), have sufficient unused hard-file space, and are available. Optionally, the server CB agent 103 would send appropriate authorization to the target machine for it to accept back up data from a specific source machine. Authorization to a client machine is performed using a distributed message middleware available on the machine. If implemented in Java, one would use RMI or CORBA for most operating systems. If implemented in C/C++, then CORBA will operate sufficiently on any platform. In Windows, one could use DCOM or COM+ or even MS Message Queuing services, which ships with MS WIN2K. Any of such distributed middleware software allows for remote communication/messaging between local processes and local remote processes. The source machine and the server CB agent both keep a copy of information describing where the source machine's backup data is stored. In step 206, if a particular client machine is in sleep mode, then the Wake Up On LAN feature can be used to awaken or power on the client machine. The Wake Up On LAN feature is available from Tivoli. Thereafter, in step 206, the source CB agent receives back up instructions from the server CB agent 103 informing it where to send the data to be backed up and when. In step 207, the source CB agent partitions the back up data into manageable packets and transmits them to the target CB agent for back up at the appropriate and specified time. This transaction is logged by the source CB agent and confirmed with the server CB agent 203 when the process has completed. In step 208, on each client machine, the CB agent has a dual role: (1) send a request for backup, and (2) accept backup requests. The process then completes in step 209.

Figure 2B:
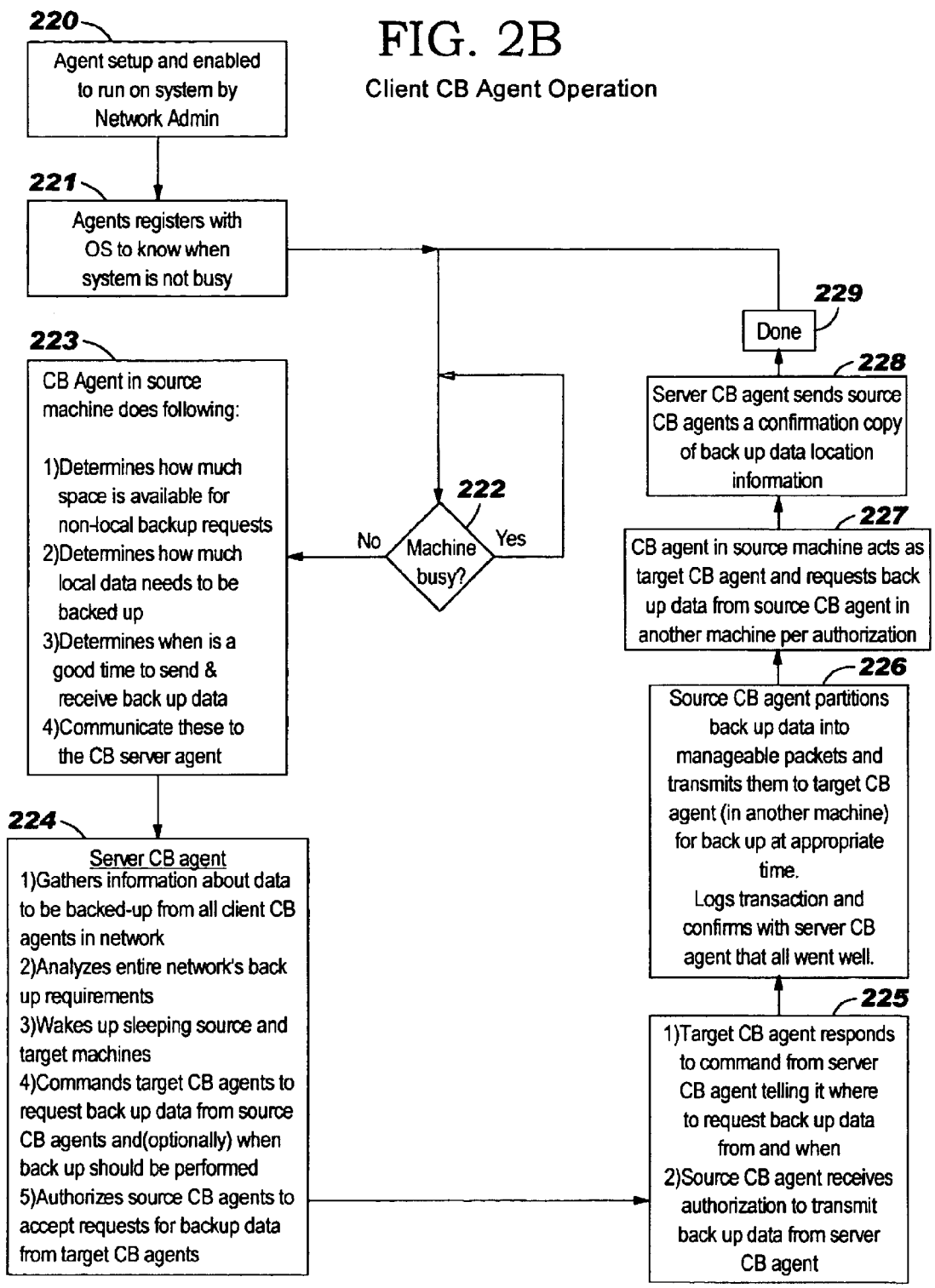

Referring to FIG. 2B, there is illustrated a flow diagram of an embodiment of the present invention, which will be referred to as "target initiated back up mode." In step 220, individual client communal backup agents are set up and enabled to run on selected ones of the machines 104–107 by the network or system administrator software 103. Thereafter, in step 221, the client CB agents register with the operating system of their machine to know when the machine is idle. Thereafter, in step 222, a determination is made whether the machine is idle. If not, then the process recycles upon itself In target initiated back up mode, each source machine tells the server CB agent 103 how much space the source machine has available to back up another machine's data, how much data the source machine needs to have backed up, and when would be a good time to perform the back up (step 223). The server CB agent considers this request in step 224, analyzes the entire network's back up data requirements, and assigns one or more target machine (s) to back up each source machine's data. More than one target machine may be used to back up a single source machine's data. The analyzing task the server CB agent performs involves ensuring that source and target machine (s) are functioning (they are powered up and running appropriate software), have sufficient unused hardfile space, and are available. If a particular client machine is in sleep mode, then the Wake Up On LAN feature can be used to awaken or power on the client machine. The Wake Up On LAN feature is available from Tivoli. In step 225, the server CB agent then commands one or more target machines to request back up data from a source machine at the proper time. Optionally, the server CB agent would send appropriate authorization to the source machine for it to accept back up data requests from specific target machines. The server CB agent sends the source machine a confirmation copy of information describing where the source machine's backup data is stored. In step 226, the source CB agent partitions the back up data into manageable packets and transmits them to the target CB agent for back up at the appropriate and specified time. This transaction is logged by the source CB agent and confirmed with the server CB agent 203 when the process has completed. In step 227, the CB agent in the source machine acts as the target CB agent and accepts the back up data from the source CB agent. In step 228, the server CB agent 203 sends to the source CB agent a confirmation copy of back up data location information. The process completes in step 229.

Referring to FIG. 2C, there is illustrated a flow diagram of an embodiment of the present invention, which will be referred to as the "server CB agent initiated back up mode". In step 240, individual client communal backup agents are set up and enabled to run on selected ones of the machines 104–107 by the network or system administrator software 103. Thereafter, in step 241, the client CB agents register with the operating system of their machine to know when the machine is idle. Thereafter, in step 242, a determination is made whether the machine is idle. If not, then the process recycles upon itself. In step 243, in server CB agent initiated backup mode, each source machine tells the server CB agent how much data the source machine needs to have backed up, how much space the source machine has available to back up another machine's data, and when would be a good time to perform the backup. In step 244, the server CB agent 103 considers this request, analyzes the entire network's backup data requirements, and assigns one or more target machine (s) to store the backup data for one or more source machines. The analyzing task the server CB agent performs involves ensuring that source and target machine(s) are functioning (they are powered up and running appropriate software), have sufficient unused hardfile space, and are available. If a particular client machine is in sleep mode, then the Wake Up On LAN feature can be used to awaken or power on the client machine. The Wake Up On LAN feature is available from Tivoli. Thereafter, in step 245, the source CB agent receives the request from the server CB agent 103 for backup data. In step 246, the source CB agent partitions the backup data into manageable packets and transmits them to the server CB agent 103 for backup at the appropriate time. This transaction is logged and confirmed with the server CB agent. In step 247, the target CB agent responds to the command from the server CB agent 103 and accepts the backup data from the server CB agent 103 at the appropriate time. In step 248, the server CB agents sends each source machine a copy of information describing where the source machine's backup data is stored. Since server CB agent initiated backup mode routes all backup related data traffic through the server CB agent, this mode can be considered the least "distributed" of all three modes. The process is then completed in step 249.

Although the present invention and its advantages have been described in detail, it should be understood that various changes, substitutions and alterations can be made herein without departing from the spirit and scope of the invention as defined by the appended claims.

What is claimed is:

1. A method for backing up data in a network of computers, comprising the steps of:
   determining what data a first client machine in the network has stored that needs to be backed up;
   determining how much free hard file space is available on a second client machine in the network;
   locking up the free hard file space on the second client machine so that the second client machine is unable to use and control such locked up hard file space; and
   backing up the data from the first client machine in the locked up hard file space of the second client machine.

2. The method as recited in claim 1, further comprising the step of waking up the second client machine when it is in a sleep mode before performing the second determining step of claim 1.

3. The method as recited in claim 1, wherein the backing up step further comprises the step of the second client machine receiving the data from the first client machine and storing the data in the locked up hard file space.

4. The method as recited in claim 1, further comprising the step of determining when is a good time to send the data from the first client machine to the second client machine.

5. The method as recited in claim 1, wherein the locking and backing up steps are controlled by a server machine in the network.

6. The method as recited in claim 1, further comprising the step of a server communal backup agent sending to a source communal backup agent a confirmation copy of backup data location information.

7. The method as recited in claim 1, further comprising the step of a server communal backup agent authorizing a source communal backup agent and a target communal backup agent to send/receive backup data to/from a specified communal backup agent.

8. An information handling system of a plurality of computers coupled to each other in a network configuration, comprising:

a plurality of client communal backup agents running on a plurality of client machines, respectively, wherein each client communal backup agent is operable for (i) determining how much free hard file space it has available on its respective client machine, and (ii) determining what data it has stored on its respective machine that needs to be backed up; and a server communal backup agent running on a server system and operable for (i) receiving from each of the plurality of client communal backup agents information on its respective client machine's available free hard file space and data needed to be backed up, (ii) determining which of the plurality of client machines will be used to backup data from the other client machines, (iii) locking up hard file space on the client machines that are determined will be used to backup the data so that such determined client machines are unable to use and control such locked up hard file space, and (iv) causing the data needed to be backed up to be communicated to the client machines determined to be used to backup the data for storage on their respective locked up hard file space.

9. The system as recited in claim 8, wherein the server communal backup agent is operable for waking up a client machine that is in sleep mode when it is needed for backup purposes.

10. The system as recited in claim 8, wherein each client communal backup agent associated with a client machine selected to backup the data is operable to receive its allocated portion of the data and store the allocated portion of the data on the locked up hard file space of its respective client machine.

11. The system as recited in claim 10, wherein each client communal backup agent is operable to determine when is a good time to send and receive backup data.

12. The system as recited in claim 8, wherein the server communal backup agent is operable for sending a confirmation copy of backup data location information to each client communal backup agent.

13. The system as recited in claim 8, wherein the server communal backup agent is operable for authorizing a source communal backup agent and a target communal agent to send and receive backup data to and from a specified communal backup agent.

14. In an information handling system comprised of a plurality of computers coupled to each other in a network configuration, a method comprising the steps of:

running a plurality of client communal backup agents on a plurality of client machines, respectively, wherein each client communal backup agent performs the steps of (i) determining how much free hard file space it has available on its respective client machine, and (ii) determining what data it has stored on its respective machine that needs to be backed up; and running a server communal backup agent on a server system, wherein the server communal backup agent performs the steps of (i) receiving from each of the plurality of client communal backup agents information on its respective client machine's available free hard file space and data needed to be backed up, (ii) determining which of the plurality of client machines will be used to backup data from the other client machines, (iii) locking up hard file space on the client machines that are determined will be used to backup the data so that such determined client machines are unable to use and control such locked up hard file space, and (iv) causing the data needed to be backed up to be communicated to the client machines determined to be used to backup the data for storage on their respective locked up hard file space.

15. The method as recited in claim 14, wherein the server communal backup agent further performs the step of waking up a client machine that is in sleep mode when it is needed for backup purposes.

16. The method as recited in claim 14, wherein each client communal backup agent associated with a client machine selected to backup the data performs the steps of receiving its allocated portion of the data and storing the allocated portion of the data on the locked up hard file space of its respective client machine.

17. The method as recited in claim 16, wherein each client communal backup agent performs the step of determining when is a good time to send and receive backup data.

18. The method as recited in claim 14, wherein the server communal backup agent further performs the step of sending to a source communal backup agent a confirmation copy of backup data location information.

19. The method as recited in claim 14, wherein the server communal backup agent further performs the step of authorizing a source communal backup agent and a target communal backup agent to send/receive backup data to/from a specified communal backup agent.

20. The method as recited in claim 14, wherein the server communal backup agent can reside within the client machine.

21. A server communal backup agent adaptable for storage on a computer readable medium and operable for performing the program steps of:

receiving from each of a plurality of client communal backup agents information on its respective client machine's available free hard file space and data needed to be backed up;

determining which of the plurality of client machines will be used to backup data from the other client machines;

locking up hard file space on the client machines that are determined will be used to backup the data so that such determined client machines are unable to use and control such locked up hard file space; and causing the data needed to be backed up to be communicated to the client machines determined to be used to backup the data for storage on their respective locked up hard file space.

22. The computer program product as recited in claim 21, wherein the server communal backup agent further performs the program step of waking up a client machine that is in sleep mode when it is needed for backup purposes.

* * * * *